United States Patent Office.

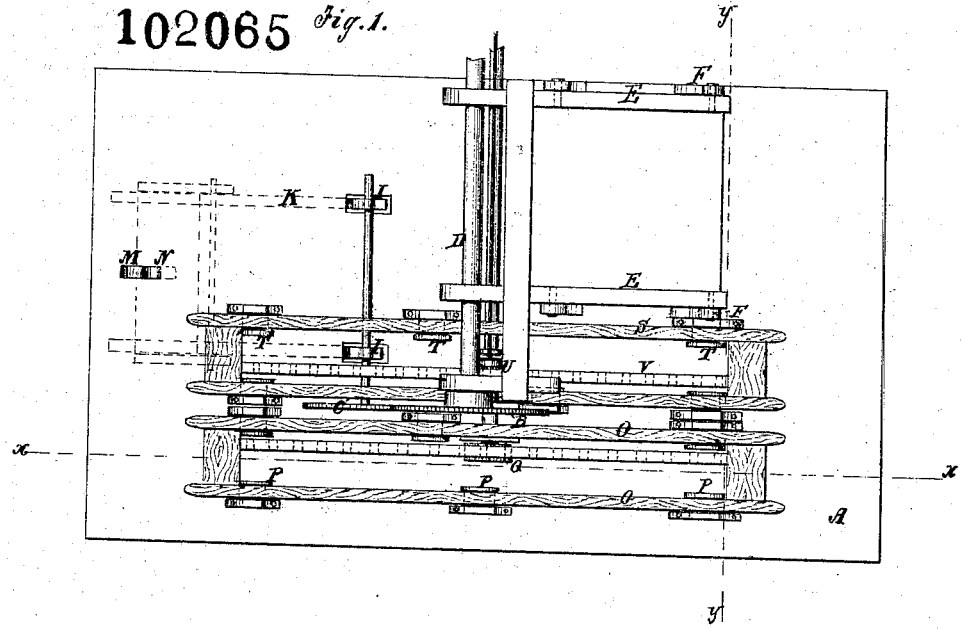
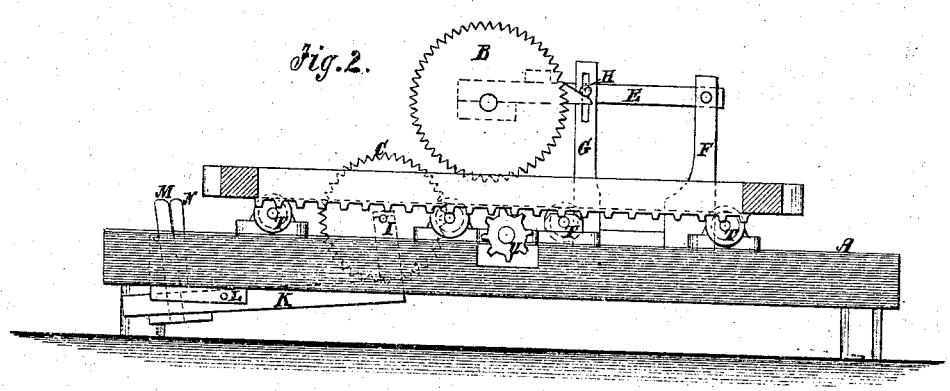
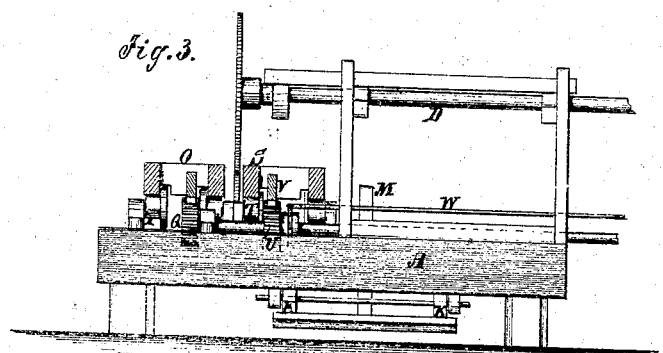

CHARLES TAYLOR, OF McKEESPORT, PENNSYLVANIA.

Letters Patent No. 102,065, dated April 19, 1870.

IMPROVEMENT IN SAW-MILLS.

The Schedule referred to in these Letters Patent and making part of the same

*To all whom it may concern:*

Be it known that I, CHARLES TAYLOR, of McKeesport, in the county of Allegheny and State of Pennsylvania, have invented a new and useful Improvement in Saw-Mills; and I do hereby declare that the following is a full, clear, and exact description thereof, which will enable others skilled in the art to make and use the same, reference being had to the accompanying drawings forming part of this specification.

This invention relates to improvements in circular-saw mills, and consists in an improved arrangement, with two circular saws, of two carriages, one on each side of the saws for operation by the same feed-shaft, and the one on the side receiving the lumber being arranged for disconnecting with the driving-shaft when not required for use, all as hereinafter more fully specified.

Figure 1 is a plan view of my improved mill;

Figure 2 is a longitudinal section of the same, taken on the line *x x*; and

Figure 3 is a transverse section, taken on the line *y y*.

A represents the floor of the mill;

B, the upper saw; and

C, the lower one.

The mandrel D of the upper saw is arranged in bearings on arms E, jointed at the other ends to pivots F, and supported, near the ends bearing the mandrel in slotted pivots G, by adjusting bolts H, by which the saw is raised or lowered as required.

The arbor of the saw C is borne on the ends of the vertical arms I of the levers K, pivoted at L under the floor, and having an adjusting-bar, M, rising up through the floor, for raising and lowering the saw C, and for holding it at the required position by being wedged in the mortise in the floor through which it passes by a wedge, N.

O is the log-carriage, on the side of the saws from which the logs are received; it is arranged on the rollers P, and operated by a rack, Q, and pinion, R, in the ordinary way.

S is the other carriage, arranged on the opposite side of the saws to receive the planks as they are being cut, and support and carry them back; also for use when edging planks for sliding them to present either edge to the saws, without the necessity of turning them over.

This carriage is arranged in like manner upon rollers T, and is operated by a pinion, U, on the same feed-shaft that carries the pinion Q, and gearing into a rack, V.

This pinion is splined to the shaft, and is capable of sliding back and forth on it to gear or ungear with the rack, for setting the carriage in motion, or stopping it while the other continues to operate.

For moving this pinion I have provided the rod W with a yoke in the end fitted in a groove in the hub of the pinion, and extending to the rear of the frame which supports the said mandrel D, so as to be in convenient reach of the operator.

This carriage S is not required to be in operation when sawing light, thin stuff, and if not arranged for ready disconnection with the driving-gears would be operated at a needless expense of power and wear.

It will be seen that my improved means of adjusting the saws is very simple and cheap.

Having thus described my invention,

I claim as new and desire to secure by Letters Patent—

1. The combination with the mandrel, of the saw C and the floor A, of the right-angled pivoted levers K, bar M, and wedge N, all substantially as specified.

2. The combination with the saws C B of the two carriages O S, when arranged for operation by pinions Q U on the same feed-shaft, and the pinion Q is arranged for gearing and ungearing with the rack of the carriage S, all substantially as specified.

CHARLES TAYLOR.

Witnesses:
H. B. SINCLAIR,
JAMES H. BERRY.